United States Patent [19]

Chikamori

[11] 4,052,274
[45] Oct. 4, 1977

[54] ELECTROCHEMICAL WIRE CUTTING METHOD

[75] Inventor: Kunio Chikamori, Tokyo, Japan

[73] Assignee: Agency of Industrial Science & Technology, Tokyo, Japan

[21] Appl. No.: 669,206

[22] Filed: Mar. 22, 1976

[30] Foreign Application Priority Data

Apr. 5, 1975 Japan .................................. 50-41629

[51] Int. Cl.² ............................................... B23P 1/12
[52] U.S. Cl. .............................. 204/129.43; 204/129.1
[58] Field of Search ........................ 204/129.1, 129.43

[56] References Cited

U.S. PATENT DOCUMENTS

| | | | |
|---|---|---|---|
| 3,294,666 | 12/1966 | Wiersma | 204/129.43 |
| 3,297,555 | 1/1967 | Rerat | 204/129.43 |
| 3,417,006 | 12/1968 | Inoue | 204/129.43 |
| 3,477,929 | 11/1969 | Namikata et al. | 204/129.43 |
| 3,520,788 | 7/1970 | Paehr | 204/129.43 |
| 3,607,689 | 9/1971 | Inoue | 204/129.43 |
| 3,649,488 | 3/1972 | Pitetti et al. | 204/129.43 |

OTHER PUBLICATIONS

Wilson, "Practice & Theory of Electrochemical Machining", 1971, p. 56.

*Primary Examiner*—T. Tung
*Attorney, Agent, or Firm*—Kurt Kelman

[57] ABSTRACT

In a method for electrochemical machining effected by disposing a work blank and a cathode opposite each other across a gap in an electrolyte and causing a flow of electric current to pass between said work blank and cathode, an improvement is disclosed which consists in using, as the cathode, a thin wire having a non-linear shape and, as the electric current, a pulsed electric current and thereby machining the work blank to a desired shape.

7 Claims, 2 Drawing Figures

ELECTROCHEMICAL WIRE CUTTING METHOD

CROSS-REFERENCE TO RELATED APPLICATION

This application relates to an improvement in the method disclosed and claimed in my U.S. Patent Application Ser. 602,135, dated Aug. 5, 1975.

BACKGROUND OF THE INVENTION

This invention relates to an improvement in the method for electrochemical machining.

With the mechanical machining technique, it is difficult to machine a sparingly malleable material such as of heatresistant alloy faithfully to a desired complicated shape. Thus, there is adopted the electrochemical machining technique. By the conventional electrochemical machining method, desired machining has been effected by approaching the cathode to the work within the electrolyte to the extent of interposing therebetween a gap of 0.02 to 0.7 mm and causing a flow of direct current of high current density of the order of from 30 to 300 $A/cm^2$ to pass between the work blank and the cathode. When the electrolysis is effected by use of direct current within an unmoving electrolyte, however, the ions, gases, etc. generated in consequence of the electrolyzing action stagnate in the gap between the work blank and the cathode to interfere with the effective flow of electric current at high current density and consequently cause local buildup of heat in the electrolyte. To preclude this phenomenon of stagnation and its attendant hindrances, the electrolyte is forced by some means or other to flow at a high rate of not less than 10 m/second during the machining or the cathode is provided with an injection nozzle adapted to induce a local flow of the electrolyte when necessary.

The forced flow of the electrolyte, however, necessitates incorporation of an extra device for generating flow. Further, the movement of the electrolyte tends to result in degradation of the machining accuracy. In the case of providing the cathode with the injection nozzle, the cathode is inevitably limited in its thickness so that an attempt to use, as the cathode a thin wire less than 0.5 mm in diameter turns out to be futile.

To avoid the various disadvantages described above, I proposed a method for effecting the electrochemical machining by use of a pulsed electric current having a pulse width of from 0.01 to 10 ms and a duty factor of not more than 0.5 (U.S. Patent Application Ser. No. 602,135), filed Aug. 5, 1975, instead of using the direct current used in the conventional method for electrochemical machining. Owing to the use of such a pulsed electric currennt, gas is formed intermittently by electrochemical action and the electrolyte in the machining zone between the work blank and the cathode is consequently agitated. Since the electrolyte in the gap is in an agitated state, desired electrochemical machining of a sparingly malleable material can be effectively carried out with high accuracy without necessity of a forced flow of the electrolyte.

In the U.S. Patent Application mentioned above, the electrochemical machining disclosed is limited to boring of fine perforations, removabl of burrs occurring along the periphery of said perforations and rectilinear cutting, Recently, a method for electric discharge machining has been developed. Unlike the conventional method for electrochemical machining, this method dispenses with the forced flow of the electrolyte. Nevertheless, it consumes the electrode in the course of machining and, therefore, necessitates frequent supply of a fresh electrode. For this reason, the electrode to be used in this method is limited to that of a straight wire. According to this method it is difficult to machine the work blank to a complicated shape by use of a curved electrode.

An object of the present invention is to provide a method for the electrochemical machining which, by using as the electrode a thin wire deviating from a rectilinear shape, permits the work blank to be machined to a desired complicated shape with high accuracy.

SUMMARY OF THE INVENTION

To accomplish the object described above according to the present invention, there is provided an improvement in the method for electrochemical machining effected by disposing a work blank and a cathode opposite each other across a gap in an electrolyte and causing pulsed electric current having a pulse width of from 0.01 to 10 ms and a duty factor of not more than 0.5 to pass between said work blank and cathode, said improvement consisting in using as the cathode a thin wire bent to a desired shape and creatively machining a shape in accordance with the path of travel of the cathode.

Owing to the use of the pulsed electric current as described above, the gas formed in consequence of the electrochemical action is generated intermittently between the cathode and the work blank and the electrolyte existing in the gap is consequently agitated locally. The agitated electrolyte serves to expel the product of the electrolysis out of the gap, with the result that the desired electrochemical machining can be carried out without having to cause any forced flow of the electrolyte. Thus, the cathode is free from otherwise possible vibration due to the flow of the electrolyte. By use of the cathode which is fabricated in advance to a desired shape, therefore, the work blank can be machined to a desired shape with high accuracy.

The other objects and characteristic features of the present invention will become apparent from the description to be given in further detail herein below with reference to the accompanying drawing.

DETAILED DESCRIPTION OF THE INVENTION

Figure 1:
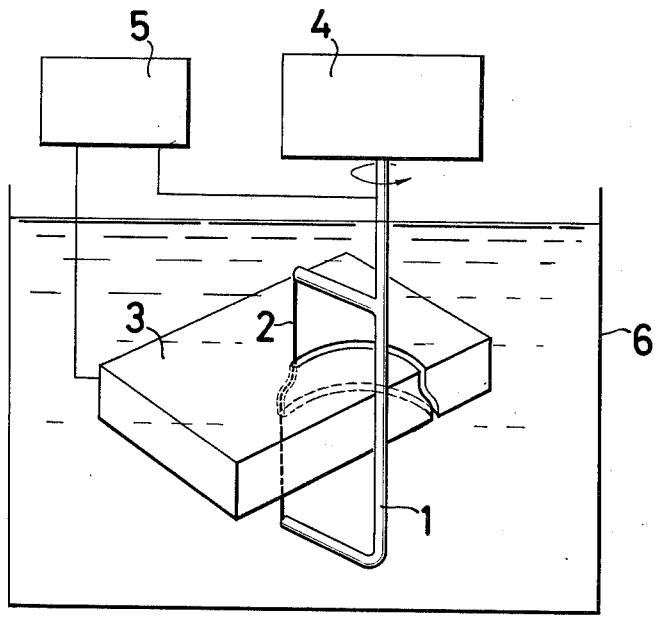
FIG. 1 is an explanatory diagram illustrating one preferred embodiment of the electrochemical machining according to the present invention.

FIG. 1 depicts one preferred embodiment of the electrochemical machining according to the present invention. A work blank 3 is immersed in an electrolytic reservoir 6 containing an electrolyte. The two ends of a thin wire (cathode) 2 are mounted on a support member 1. The central portion of the wire is bent into a desired, non-rectilinear shape and opposed to said work blank 3 across a balanced gap. The support member 1 is carried by a feed device 4 above the electrolytic reservoir 6 so as to be moved or rotated in any desired direction. The work blank 3 and the support member 1 are each connected by a wire to a power source 5.

A fine copper wire is used as the cathode. Its ends are mounted on the support member 1, and a central portion intermediate the ends is laterally offset from a straight line connecting the ends, whereby the spacing of the ends is smaller than the length of the central portion. A solution of NaCl, NaClO$_3$, HCl or some other suitable compound is used as the electrolyte.

A pulsed electric current having a voltage of 5 to 50V, a pulse width of 0.01 to 10 ms and a duty factor of not more than 0.5 is supplied from the power source 5 to be delivered through the work blank and the support member to the cathode. The pulsed electric current causes an action of electrochemical dissolution between the cathode and the work blank, with the result that the portion of the work blank opposed to the cathode is dissolved. Cutting the work blank to a desired shape, therefore, can be accomplished by giving the cathode a required shape and controlling the direction of the movement of the cathode by means of the feed device. Since there is used a pulsed electric current in place of a direct current in this case, the gas formed in consequence of the electrochemical reaction is generated intermittently and the electrolyte existing in the gap between the cathode and the work blank is consequently agitated. Because of the agitation of the electrolyte, the desired electrochemical machining can be effectively carried out without need of a forced flow of the electrolyte. The preferred embodiment in FIG. 1 is depicted as using a support member adapted to rotate round its axis. Where necessary, there can of course be used a support member adapted to be moved in any desired direction.

Desirably the pulsed electric current to be used in the method for the electrochemical mechining according to the present invention has a pulse width of from 0.01 ms to 10 ms and a duty factor of not more than 0.5. When the pulse width is less than 0.01 ms, virtually all the electric current is spent in charging and discharging of the electrical double layer, rendering the desired machining unattainable. When the pulse width exceeds the upper limit 10 ms, however, the phenomenon of concentration polarization becomes so conspicuous as to make it no longer possible to obtain a sufficiently high current density, with the result that the machining speed is lowered and the machining accuracy is degraded. When the duty factor of the pulse current exceeds the upper limit 0.5, the pulse density so closely approaches that of direct current that there similarly ensues the phenomenon of concentration polarization which renders the machining impracticable.

Figure 2:
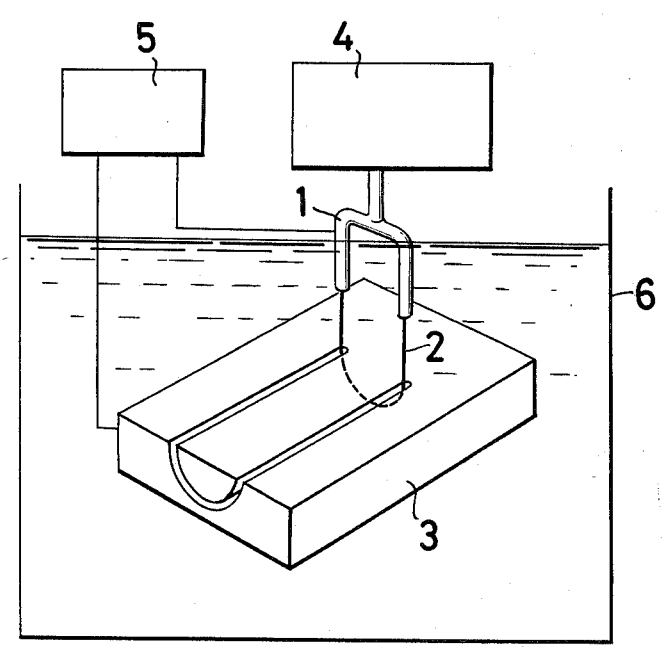
FIG. 2 is an explanatory diagram illustrating another preferred embodiment of the electrochemical machining according to the present invention.

FIG. 2 illustrates another preferred embodiment of the electrochemical machining according to the present invention. In this preferred embodiment, a thin wire cathode 2 has a central portion of semicircular shape so that a groove of a semicircular cross section will be formed in a work blank 3 in a direction transverse to the plane of curvature of the wire 2 by having the support member 1 moved along the work blank 3. In this case, when the cathode is formed in the shape of a V or W, the groove can be formed to the same shape as that of the cathode. Further, when the cathode is not limited to straight line movement but can also travel along curved lines, the groove of any desired complicated shape can be formed without deformation even in a work blank of a material difficult to machine such as a heat-resistant alloy etc.

According to the method of the present invention described above, the electrochemical machining is effected while the electrolyte existing in the gap between the electrodes is kept at rest or in a state of gentle flow free from forced movement. The thin-wire cathode, therefore, is free from possible forces which might otherwise arise because of the forced movement of the electrolyte and consequently can be maintained in a fixed shape at all times. This method, accordingly, can be used to machine the work blank to any of a rich variety of unique shapes with high accuracy by suitably selecting the shape of the thin-wire cathode and properly controlling the direction of the movement of the feed device. Moreover, since the apparatus to be used for effecting this electrochemical machining dispenses with means for the forced movement of the electrolyte, it can be fabricated compactly and inexpensively as compared with the apparatus used for the conventional electrochemical machining. Further, the thin-wire cathode can be simply and inexpensively manufactured from a copper wire having a diameter on the order of 0.1 to 0.5 mm. In addition, the present machining involves no consumption of the cathode. Thus, the apparatus also dispenses with a cathode feed device which is indispensable for the wire cutting operation resorting to electric discharge. The scope of application of the method of this invention can be widened by having the feed device of the support member interfaced with automatic control means.

Since the method of the present invention effects the machining only to give contour of a necessary shape to the work blank, it may justly be regarded as a technique for saving both resources and energy.

Now, a preferred embodiment of the present invention will be described. It, however, should not be construed as limiting this invention in any way.

EXAMPLE 1

In an electrolyte having NaClO$_3$ contained at a concentration of 350 g per liter, a work blank of a carbon steel (possessing a carbon content of 0.46 percent) having a thickness of 10 mm and a cathode of copper wire having a diameter of 0.2 mm and curved in a semicircular shape 3.5 mm in radius as illustrated in FIG. 2 were disposed opposite each other across a gap. A pulsed electric current having a pulse width of 0.5 ms, a pulse period of 2 ms, a voltage of 11 V and an average machining current of 3 A was caused to pass between said work blank and cathode while the cathode was moved at a speed of 0.38 mm/minute and the electrolyte was not forcibly moved. After the machining had been continued in this manner for about 20 minutes, a groove (having a cutting gap of 0.7 mm) of a semicircular cross section 3.5 mm in radius was formed to a length of 7.5 mm in said work blank.

EXAMPLE 2

In an electrolyte having NaClO$_3$ contained at a concentration of 350 g per liter and Na$_2$SO$_3$ contained as an additive of Cr$^{6+}$ elution at a concentration of 10 g per liter, a work blank of tool steel (containing 1.5% of carbon and 10.56% of chromium and being not less than H$_{RC}$61 in hardness) and a cathode of copper wire having a diameter of 0.32 mm and curved in a semicircular shape 9 mm in radius as illustrated in FIG. 2 were disposed opposite each other across a gap. A flow of a pulse electric current having a pulse width of 0.05 ms, a pulse period of 0.4 ms, a voltage of 18 V and an average machining current of about 4.3A was caused to pass between said work blank and cathode while the cathode was moved at a speed of 0.12 mm/minute and the electrolyte was not forcibly moved. After the machining had been continued in this manner for about 167 minutes, a groove (having a cutting gap of 0.6 mm) of a semicircular cross section 9 mm, in radius was formed to a length of 20 mm in said work blank.

EXAMPLE 3

In the same electrolyte as that used in Example 1, the same work blank as that used in Example 2 and a cathode of V-shaped copper wire having a diameter of 0.32 mm, both sides of 8.5 mm and an angle of about 48.5° were disposed opposite each other across a gap. A flow of a pulse electric current having a pulse width of 0.05 ms, a pulse period of 0.4 ms, a voltage of 16V and an average machining current of about 2.7 A was caused to pass between said work blank and cathode while the cathode was moved at a speed of 0.16 mm/minute and the electrolyte was not forcibly moved. After the machining had been continued in this manner for about 125 minutes, a V-shaped groove (having a cutting gap of 0.5 mm) having a width of 7 mm and a depth of 7.75 mm was formed to a length of 20 mm in said work blank.

EXAMPLE 4

In the same electrolyte as that used in Example 1, a work blank the same as that used in Example 1 except that its thickness was 5 mm and a cathode of copper wire having a diameter of 0.32 mm and held in position by a supporter were disposed opposite each other. The copper wire was so inclined that it intersected the work blank along a line extending from a point 8.9 mm from one corner of the upper surface of the work blank to at point 5.8 mm away from the corresponding corner of the lower surface of the work blank. Pulsed electric current having a pulse width of 0.5 ms, a pulse period of 2 ms, a voltage of 13 V and an average machining current of about 4.1 A was caused to pass between said work blank and cathode while the supporter was rotated. After the machining had been continued in this manner for about 37 minutes, a quarter of a conic frustum having a height of 5 mm, an upper diameter of 17.8 mm and a lower diameter of 11.5 mm (having a cutting gap of 0.9 mm) was separated from the work blank. The cathode on the upper surface of the work blank was moved at a speed of 0.38 mm/minute and that on the lower surface of the work blank at a speed of 0.24 mm/minute.

What is claimed is:

1. In a method of electrochemical machining in which a work blank member and a cathode member are disposed opposite each other in an electrolyte, a pulsed electric current having a pulse width of 0.01 to 10 ms and a duty factor of not more than 0.5 is passed between said members while one of said members is moved relative to the other member, the cathode member being a thin wire having two end portions mounted on a support and a central portion intermediate said end portions, the improvement which comprises said central portion being laterally offset from a straight line connecting said end portions.

2. The method according to claim 1, wherein said one member is moved relative to the other member in a predetermined direction, said central portion being laterally offset from said straight line in a plane transverse to said predetermined direction.

3. The method according to claim 2, wherein said thin wire essentially consists of copper.

4. The method according to claim 3, wherein said central portion of semicircular shape.

5. The method according to claim 3, wherein said central portion of V-shape.

6. The method according to claim 2, said plane being perpendicular to said direction.

7. The method according to claim 1, wherein the spacing of said end portions is smaller than the length of said central portion.

* * * * *